Figure 23:
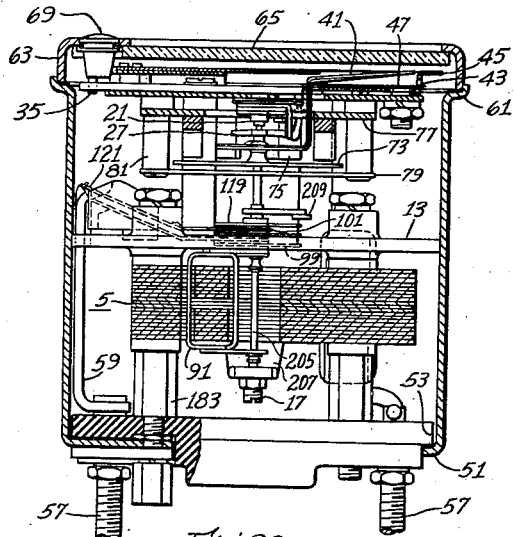

March 16, 1948.　　D. A. YOUNG ET AL　　2,438,027
ELECTRICAL MEASURING INSTRUMENT
Filed Sept. 2, 1943　　4 Sheets-Sheet 1
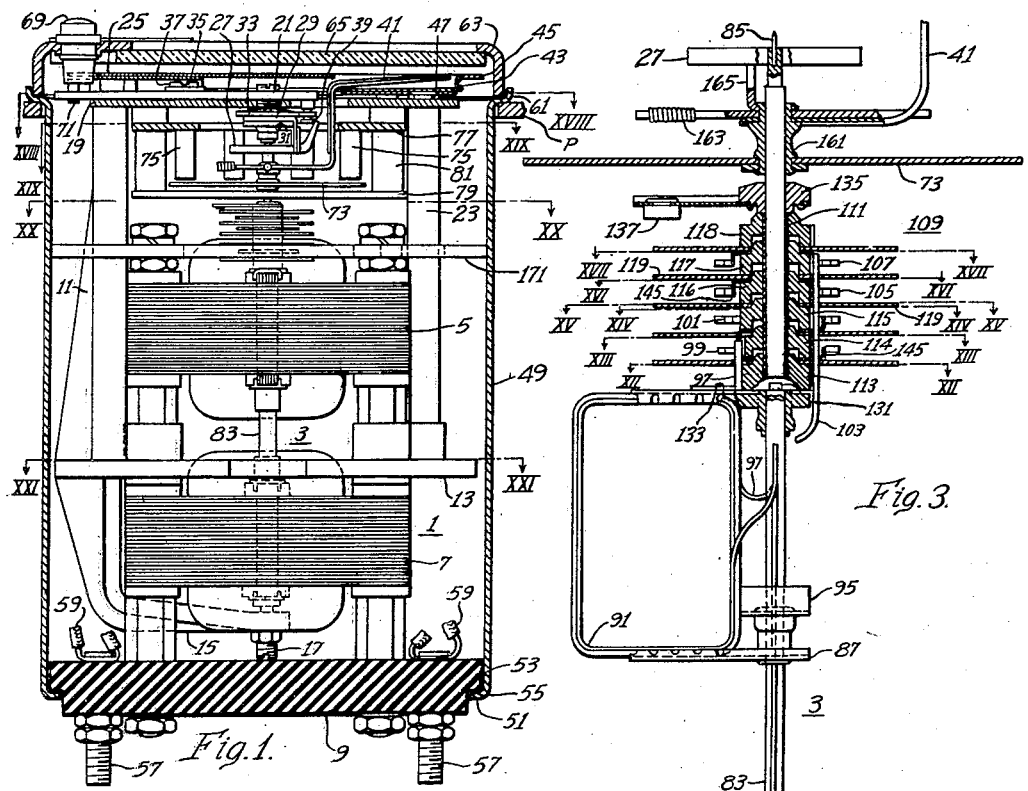
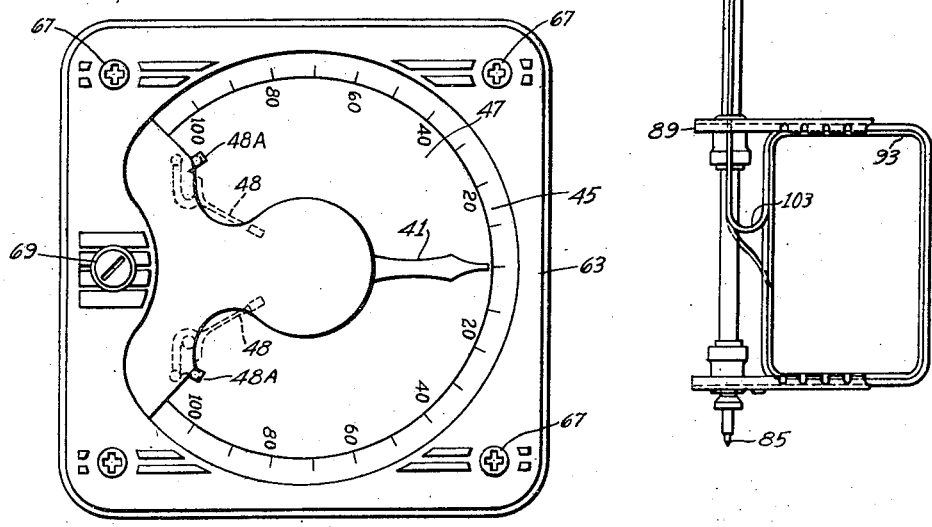
INVENTORS
*Douglass A. Young, Lawrence J. Lunas
and Bernard E. Lenehan.*
BY
ATTORNEY

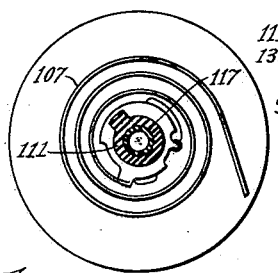

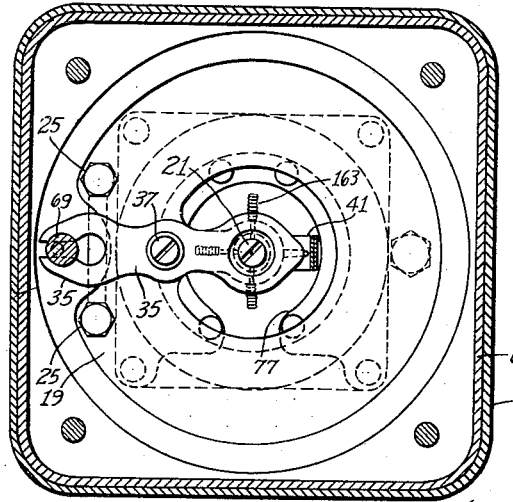
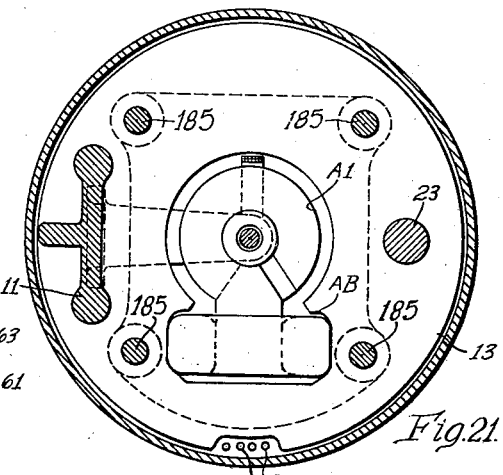
Fig.18.
Fig.21.
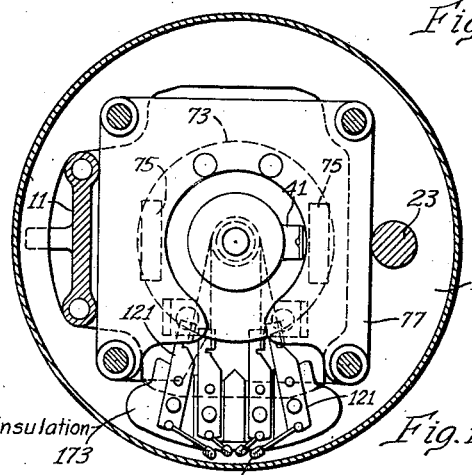
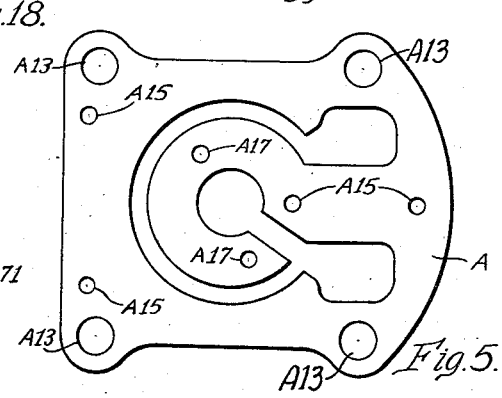
Fig.19.
Fig.5.
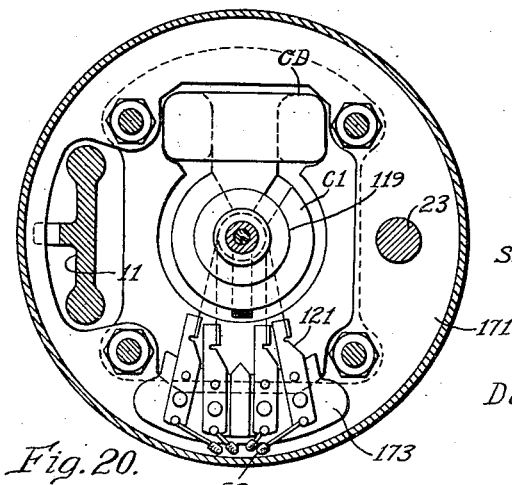
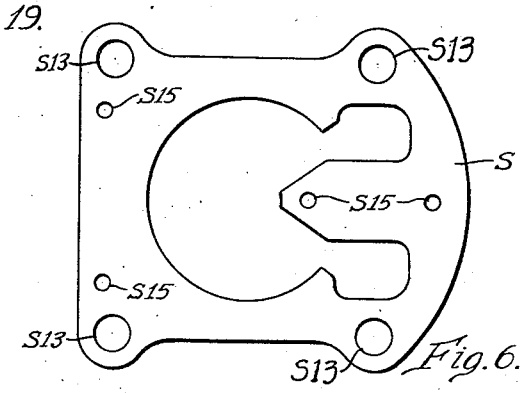
Fig.20.
Fig.6.
INVENTORS
Douglass A. Young, Lawrence J. Lunas
and Bernard E. Lenehan.
BY
C. L. Freedman
ATTORNEY March 16, 1948.    D. A. YOUNG ET AL    2,438,027
ELECTRICAL MEASURING INSTRUMENT
Filed Sept. 2, 1943    4 Sheets-Sheet 4

INVENTORS
Douglass A. Young, Lawrence J. Lunas
and Bernard E. Lenehan.
BY
C. L. Freedman
ATTORNEY Patented Mar. 16, 1948

2,438,027

UNITED STATES PATENT OFFICE 2,438,027

ELECTRICAL MEASURING INSTRUMENT

Douglass A. Young, East Orange, Lawrence J. Lunas, Cedar Grove, and Bernard E. Lenehan, Bloomfield, N. J., assignors to Westinghouse Electric Corporation, East Pittsburgh, Pa., a corporation of Pennsylvania Application September 2, 1943, Serial No. 500,896

16 Claims. (Cl. 171—95)

This invention relates to electromagnetic devices, and it has particular relation to long-scale electrical measuring instruments suitable for measuring a function of two variable electrical quantities.

Electromagnetic devices responsive to a function of a plurality of variable quantities are well known in the art. For example, reference may be made to an electrodynamic measuring instrument which is employed for measuring functions of voltage and current such as watts, vars and power factor. In its most common form, the electrodynamic instrument is an air core instrument having a fixed coil, and having a movable coil which is mounted for rotation with respect to the fixed coil. An indicating device, such as a pointer or pen, is attached to the movable coil for rotation through an arc which generally is substantially less than 180°.

In some cases, it is desirable to employ a magnetic core for an electrodynamic instrument. This is particularly true of long-scale electrodynamic instruments, wherein the increased torque resulting from the utilization of a magnetic core is desirable. Such long-scale instruments may be designed to rotate an indicator device such as a pointer or pen with reference to a scale or chart through an angle which may be of the order of 250°. By utilizing a magnetic core of suitable design it is possible to provide in a long-scale instrument a long arcuate air gap having a satisfactory magnetic flux distribution therein.

The provision of a magnetic core in an electrodynamic instrument has complicated materially the assembly and disassembly of the instrument. This is particularly true for instruments having two separate, single-phase elements or units designed to measure electrical quantities in a three-wire or polyphase circuit. In a polyphase instrument of this type two separate single-phase units are employed, the movable coils of which are attached to a common shaft. When magnetic cores are provided, suitable means and procedure must be developed for inserting the magnetic cores in their appropriate coils.

If the magnetic core for a movable coil is asymmetric with respect to the path of travel of the movable coil, the core and coil in effect constitute an electromagnetic solenoid. Current passing through the coil produces a force urging the coil towards a position wherein the magnetic core offers its lowest magnetic reluctance to magnetic flux produced by the current. Since this force, if present in an electrodynamic measuring instrument, may be a source of error it is desirable that the magnetic core be symmetric with respect to the path of travel of the coil.

In accordance with the invention, a magnetic structure is provided for an electromagnetic device or unit, such as an electrodynamic measuring instrument. This magnetic structure, as employed for a single-phase instrument or unit, includes two magnetic portions which are asymmetric with respect to the path of travel of the movable coil. However, the asymmetries of the two magnetic portions are so located with respect to the path of travel of the movable coil that the resultant magnetic structure is substantially symmetric with respect to such path.

In a preferred embodiment of the invention, the magnetic structure includes two annular magnetic cores each having a channel extending radially from the interior to the exterior thereof of sufficient size to permit passage of a side of the movable coil therethrough. These annular magnetic cores are mounted in alignment on the axis of rotation of the movable coil with their channels disposed respectively adjacent the two ends of the path of travel of the movable coil. Because of this angular spacing of the channels, the two annular magnetic cores provide a resultant magnetic structure which is substantially symmetric with respect to the path of travel of the movable coil.

The annular magnetic cores are spaced axially along the axis of rotation of the rotatable core by a distance sufficient to permit passage of a side of the coil therebetween. This permits introduction of one side of the coil through one of the channels, rotation of the coil to a position adjacent the other of the channels and passage of the side of the coil through the latter channel to bring the coil into a position wherein it can embrace both of the annular magnetic cores.

For a polyphase instrument having two single-phase units incorporated therein, two units each similar to the unit described in the preceding three paragraphs have their movable coils connected to a common shaft for rotation with respect to their magnetic structures. In such a polyphase instrument, the coils may be threaded into their respective magnetic structures by a procedure which is an extension of that described for the single-phase measuring instrument.

A further problem is presented in the provision of suitable connections for the movable coils of a long-scale measuring instrument. This is particularly true of a polyphase measuring instrument wherein four leads from two movable coils must be connected to a compact terminal assembly. In accordance with a further aspect of the invention, a plurality of spacers in the form of collars are mounted on the coil shaft. These collars have interfitting male and female parts and may be of similar construction. The male and female parts are so located that each collar is rotated angularly with respect to its adjacent collar about the axis of rotation of the shaft. A plurality of flexible conductor strips is provided, each of which is positioned by a separate one of the collars. Because of the angular and axial spacing of the collars each of the conductor strips is suitably axially and angularly positioned with respect to the axis of the shaft.

It is, therefore, an object of the invention to provide an improved electromagnetic device which is responsive to a function of two variable quantities.

It is a further object of the invention to provide an improved polyphase electrodynamic measuring instrument having a long scale.

It is a still further object of the invention to eliminate substantially all solenoid action in an electrodynamic instrument having an asymmetric magnetic core element.

It is another object of the invention to provide an electrodynamic instrument having a rotatable coil provided with two asymmetric magnetic cores, with the asymmetries of the magnetic cores so disposed that the resultant magnetic core is substantially symmetric with respect to the path of travel of the coil.

It is an additional object of the invention to provide an electrodynamic instrument having a rotatable coil and having a pair of annular magnetic cores each provided with a radial channel, the channels being disposed respectively adjacent the opposite ends of the path of travel of the coil to provide a resultant magnetic core which is substantially symmetric with respect to the path of travel of the coil.

It is a still further object of the invention to provide an improved terminal assembly for the rotatable coil assembly of an electrodynamic instrument.

Figure 22:
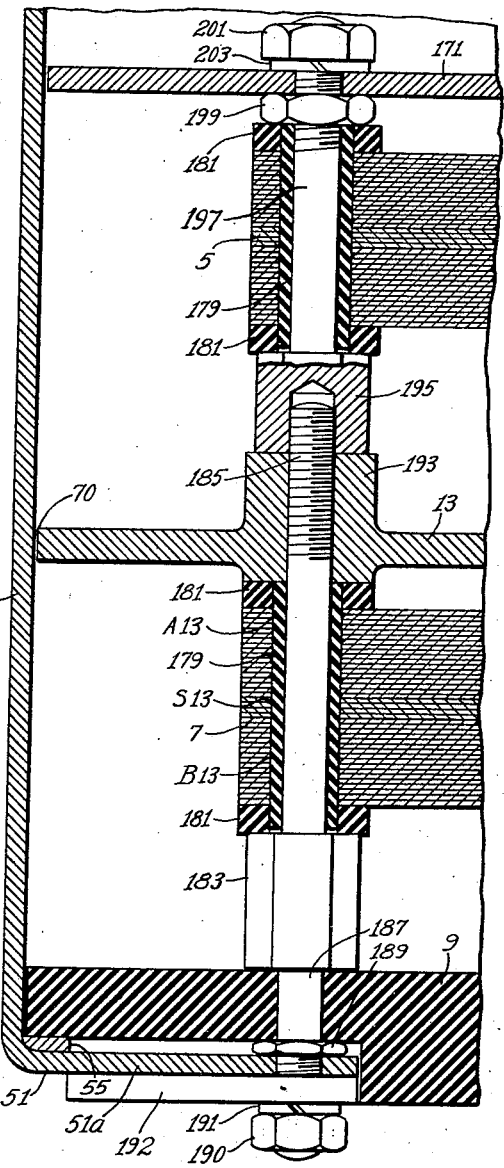
Figure 10:
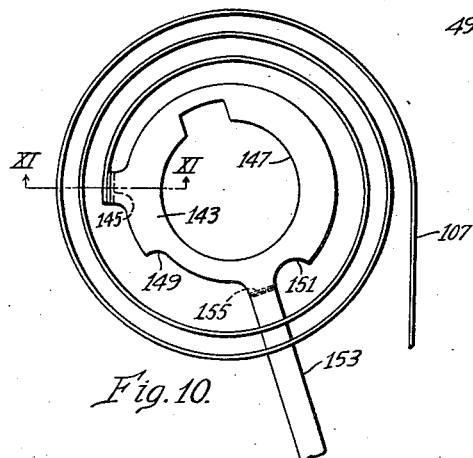
Figure 11:
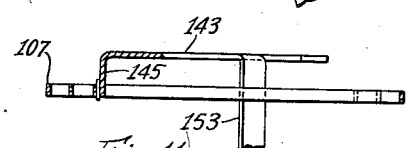
Figure 24:
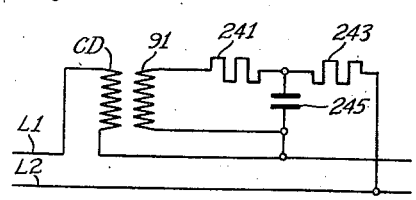

Other objects of the invention will be apparent from the following description taken in conjunction with the accompanying drawings, in which:

Figure 1 is a view in sectional elevation of a polyphase electrodynamic measuring instrument embodying the invention, Fig. 2 is a view in top plan of the instrument illustrated in Fig. 1, Fig. 3 is a view in front elevation with parts broken away, and parts rotated with respect to each other, of a rotor assembly suitable for the instrument of Fig. 1, Fig. 4 is a view in perspective with parts broken away and parts exploded showing the relationship of parts of the instrument of Fig. 1, Figs. 5 and 6 are views in top plan of laminations suitable for the magnetic structures employed in the instrument of Fig. 1, Figs. 7, 8 and 9 are views respectively in top plan, side elevation and bottom plan of a spacer or collar employed in the terminal assembly of an instrument, Fig. 10 is a view in top plan of a conducting strip and a holder suitable for an instrument terminal assembly, Fig. 11 is a view in side elevation of the conducting strip and holder of Fig. 10 with a portion bent into final position, Figs. 12 to 17, inclusive, are views taken respectively on the lines XII—XII, XIII—XIII, XIV—XIV, XV—XV, XVI—XVI and XVII—XVII of Fig. 3, Figs. 18, 19, 20 and 21 are views taken respectively on the lines XVIII—XVIII, XIX—XIX, XX—XX and XXI—XXI of Fig. 1, Fig. 22 is a detail view in sectional elevation showing the attachment of the stator of Fig. 1 to a base member, Fig. 23 is a view in sectional elevation of an instrument embodying a modified form of the invention, and Fig. 24 is a diagram of circuit connections suitable for the instrument of Fig. 23.

Referring to the drawings, Fig. 1 shows an electro-dynamic measuring instrument suitable for measuring electrical quantities in a three-wire or polyphase electrical circuit. This instrument includes a stator assembly 1 and a rotor or shaft assembly 3 which is mounted for rotation with respect to the stator assembly. The stator assembly comprises a pair of magnetic structures 5 and 7 which are securely bolted to a base member 9. The stator assembly also includes a bearing support 11 having a ring-shaped supporting plate 13 which may be secured in position by the bolts employed for securing the stator assembly to the base member 9. The bearing support 11 includes an arm 15 having in threaded engagement therewith a bearing screw 17 which provides a lower bearing for the rotor assembly 3. The bearing support 11 also has secured thereto a bridge plate 19 in which a bearing screw 21 is threadedly positioned for completing the bearing support for rotor assembly 3. The bridge plate 19 is further supported by a pillar 23 secured to the plate 13, and may be secured to the bearing support 11 and the pillar 23 in any suitable manner as by machine screws 25.

For biasing the rotor assembly 3 to a predetermined position with respect to the stator assembly, a spiral control spring 27 is carried by the rotor assembly and has its outer end attached to a disk 29 rotatably mounted on a hollow rivet 31 which is secured to the bridge plate 19. Rotation of the disk 29 is effected through an adjacent disk 33 in biased, frictional engagement therewith by adjustment of a zero-adjuster lever 35 which is pivotally secured to the bridge plate 19 by means of a machine screw 37. The lever 35 determines the position of a pin 39 which, in turn, determines the position of the disk 33.

For indicating movements of the rotor assembly, the rotor assembly 3 has a pointer 41 which projects through an annular groove in the bridge plate 19 and overlies a dial plate 43. The dial plate is of a dished formation having an arcuate flange 45 adjacent the tip of the pointer 41. Suitable scale markings may be applied to the flange 45, as shown more clearly in Fig. 2. An arcuate plate 47 having scale numerals thereon may be secured to the dial plate 43 in any suitable manner as by riveting. As shown in Fig. 2, the instrument is of the center-zero type, wherein the pointer 41 may be deflected in either of two directions away from the central point. As well understood in the art, the rotor assembly may be adjusted to provide an instrument wherein the pointer is normally at one end of the scale when the instrument is deenergized and is deflected towards the other end of the scale in response to energization of the instrument. Suitable stops 48 and 48a may be positioned at the ends of the path of travel of the pointer 41 to engage the pointer and prevent overtravel thereof.

The casing for the instrument of Fig. 1 may take the form of a magnetically soft steel cylindrical shell 49 which serves as a magnetic shield for the instrument. The shell 49 has an inwardly turned flange 51 which engages a flange 53 of the base member 9. A gasket 55 may be interposed between the flanges. The base member 9 may be formed of a suitable insulating material, such as a phenolic resin, and may carry terminal screws 57 which are connected to the windings of the instrument by means of conductors 59.

At its opposite end the shell 49 may have an outwardly extending flange 61 for reception of a cap 63. The cap 63 may be formed of a suitable material, such as steel or a phenolic resin, and has a transparent window 65 associated therewith for exposing the pointer and dial assembly of the instrument. If desired, the cap and flange 61 may have a rectangular outline as illustrated in Fig. 2. The cap may be attached to the shell 49 by means of machine screws 67. The instrument may be mounted in any suitable manner. For example the shell 49 may pass through an opening in a panel P and may be secured to the panel by machine screws (not shown).

For actuating the zero adjustment of the instrument, a zero-adjuster button 69 is held captive by the cap 63. This button has an eccentric pin 71 extending into an opening in the lever 35. Rotation of the button 69, therefore, serves to rotate the lever and thereby to adjust the control spring 27. The casing, zero-adjuster mechanism and dial assembly of the instrument illustrated in Fig. 1 may be similar to the corresponding structure disclosed in the copending application of V. S. Thomander, Serial No. 500,895, filed September 2, 1943, now Patent 2,389,393, and assigned to the same assignee.

In instruments of the type herein described, it is desirable to damp movements of the rotor assembly. To this end, the rotor assembly includes a damping disk 73 which is formed of an electroconductive material such as aluminum or copper. The damping disk 73 is positioned for rotation in the magnetic field produced by a pair of U-shaped permanent magnets 75. These magnets are attached to a framework which includes a base plate 77 and a plate 79 which is formed of a magnetically-soft material, such as soft steel. The plates 77 and 79 are attached to each other by means of pillars 81 and the entire framework is attached to the bridge plate 19 by means of screws (not shown). It will be noted that the poles of the magnets 75 are spaced from the magnetic plate 79 to define an air gap within which the damping disk 73 is mounted for rotation. The entire framework is so configured that it may be removed from the rotor assembly in a radial direction with respect to the axis of the rotor assembly. This construction is illustrated more particularly in Fig. 19.

As shown more clearly in Fig. 3, the rotor assembly 3 includes a shaft 83 having pivots 85 at its ends. The shaft is broken into two portions which in Fig. 3 are angularly displaced from their normal positions relative to each other about the shaft axis by 90° to show more clearly the structure of the rotor assembly. Two coil brackets 87 and 89, which may be in the form of channels, are secured to the shaft 83. Coils 91 and 93 are secured, respectively, to the brackets 87 and 89 in any suitable manner as by cementing the coils thereto, and are suitably insulated therefrom. Since these coils are rotatable about the axis of the shaft 83, they may be termed "movable coils." To avoid undue deflection of the shaft in response to shock, a bumper disk 95 may be carried by the shaft at a centrally disposed point. This bumper disk is proportioned to have a small clearance with respect to the stator assembly 1. Consequently, if the shaft tends to deflect appreciably, the bumper engages the adjacent stator assembly to prevent excessive deflection thereof.

It will be observed that the coil 91 has two terminal leads 97 which are attached, respectively, to conductor strips 99 and 101. The coil 93 has two terminal leads 103 which are attached, respectively, to conductor strips 105 and 107. The conductor strips form part of a terminal assembly 109 which is employed to connect the coils 91 and 93 to certain of the conductors 59. As illustrated in Figs. 1, 3 and 4, the terminal assembly 109 is located adjacent one end of the rotor assembly. Such a location is preferable to a location intermediate the magnetic structures 5 and 7 from the standpoint of accessibility. For the purpose of insulating the terminal assembly from the shaft 83, an insulating sleeve 111 may be positioned about the shaft. In addition, a plurality of spacers in the form of collars 113, 114, 115, 116, 117 and 118 are positioned on the sleeve 111. The collars are employed for locating the conductor strips in predetermined axial and angular positions with respect to the shaft 83.

Because of the extreme angular movement of the shaft 83 with respect to the stator assembly, the conductor strips must be extremely flexible and capable of permitting the required angular movement of the shaft. To prevent contact between the conductor strips, a plurality of insulating barriers 119 are provided. These barriers may be formed of an insulating material such as mica.

It is desirable that the terminal strips be spaced angularly about the shaft as well as axially thereof. This spacing is illustrated in Fig. 4. The end of each of the conductor strips, when in a free condition, is positioned to lie adjacent a separate lug 121 which is mounted on the stator assembly. Each conductor strip which may be formed of a suitable material, such as copper or brass, may be soldered to its associated lug 121.

In order to locate the conductor strips accurately the collars 113 to 118 are provided with interfitting male and female parts. Since these collars all may be similar in construction, a description of one of the collars 113 should suffice. Referring to Figs. 7, 8 and 9, it will be observed that the collar 113 has a cylindrical neck 123 projecting from one end thereof. This neck has a key 125 extending therefrom in a radial direction with respect to the axis of the collar. The opposite end of the collar is provided with a circular recess 127 and a keyway 129 proportioned to receive snugly the neck 123 and key 125 of an adjacent collar. To facilitate reception of the neck 123 and the key 125 in an adjacent collar, these parts may have bevelled edges as illustrated in Figs. 7 and 8. By inspection of Fig. 7, it will be observed that the key 125 and the keyway 129 on each collar are displaced from each other about the axis of the collar by an angle $\theta$. Consequently, when a plurality of collars are nested, as shown in Fig. 3, each collar is displaced angularly with respect to an adjacent collar by the angle θ.

For positioning the collars with respect to the shaft 83, each collar may be provided with a keyway 131, as illustrated in Figs. 7, 8 and 9. In order to distinguish the keyways from each other, the keyway 131 may have a height and width smaller than the corresponding height and width of the keyway 129. As shown in Fig. 3, the keyway 131 of one of the collars 113 is positioned to receive a key 133 formed on the bracket 87. The angular relationship between the key 133 and the adjacent collar 113 is clearly shown in Fig. 12. Consequently, all collars are accurately positioned both angularly and axially with respect to the shaft 83. Axial movement of the collars is prevented by a disk 135 secured to the shaft 83 which also serves to support a counterweight 137 for the pointer 41. The collars may be formed conveniently by a molding operation from a suitable insulating material such as a phenolic resin. For receiving the terminal leads from the coils 91 and 93, the collars are provided with peripheral recesses 139 and 140.

The conductor strips all are of substantially similar construction and may be discussed with reference to Figs. 10 and 11 which illustrate the conductor strip 107. The conductor strip 107 has its inner end connected to a holder 143 in the form of a sheet of electroconductive material. The holder 143 has a lug 145 bent at right angles thereto which is soldered to the inner end of the conductor strip. The holder 143 has an opening 147 formed therein for the purpose of receiving snugly the neck 123 and the key 125 of a collar. It will be observed that peripheral recesses 149 and 151 are provided in the holder for receiving the terminal leads of the coils 91 and 93. It will be observed further that the holder 143 has a terminal lead 153 projecting therefrom. This terminal lead is bent at right angles to the holder 143 along the line 155. The direction of the bend depends upon the position of the conductor strip with respect to the shaft 83 and will be discussed in greater detail below. For the specific conductor strip 107 illustrated in Fig. 11, the terminal lead 153 is bent downwardly.

The construction of the terminal assembly will be understood more fully from a consideration of Figs. 12 to 17, in conjunction with Fig. 3. As shown in Fig. 12, the collar 113 is positioned to receive the terminal leads 97 and 103. The terminal strip 99 has its holder 143 positioned over the neck 123 and key 125 of the collar 113. This positions the conductor strip 99, as shown in Fig. 13. Referring to Fig. 3, it will be observed that the lug 145 associated with the conductor strip 99 extends in a vertically upward direction, as viewed in Fig. 3, whereas the terminal lead 153 associated with the conductor strip 99 is bent downwardly to form one of the leads 97.

The conductor strip 101 is associated with the collar 114 in the same manner in which the conductor strip 99 is associated with the collar 113. It will be recalled, however, that the collar 114 is displaced angularly about the shaft 83 with respect to the collar 113 by the angle θ. Consequently, the conductor strip 101 occupies the position illustrated in Fig. 14 when the conductor strip 99 occupies the position illustrated in Fig. 13. The terminal lead 153 of the holder associated with the conductor strip 101 is again bent downwardly to form the other of the two terminal leads 97. These terminal leads 97 have insulating tubing applied therearound as shown in Fig. 3.

The collars 115 and 116 have only a barrier 119 therebetween. This barrier has a central opening configured to receive snugly the neck 123 and key 125 of the collar 115. By inspection of Fig. 15, it will be observed that the barrier 119 also has openings 157 and 159 therein to provide passage for the various terminal leads. A similar barrier, as previously indicated, is positioned between each pair of collars.

The conductor strip 105 is positioned to receive the neck 123 and key of the collar 116. This conductor strip and its holder are reversed with respect to the conductor strips 99 and 101 to position the free end of the strip 105 on the opposite side of the shaft 83. This means that the lug 145 associated with the conductor strip 105 extends downwardly as viewed in Fig. 3. The terminal lead 153 associated with the conductor strip 105 is bent downwardly to form one of the terminal leads 103.

The conductor strip 107 and its holder are associated with the collar 117 in the same manner in which the conductor strip 105 and its holder are associated with the collar 116. However, inasmuch as the collars 116 and 117 are displaced from each other angularly by the angle θ, the free ends of the conductor strips 105 and 107 are angularly spaced as illustrated in Figs. 16 and 17.

By adjusting the strips to be unstressed at the mid-scale position of the pointer the maximum deflection of each strip from its unstressed position corresponds to half the maximum arc of rotation of the rotor assembly. Since the strips associated with one of the movable coils unwind while the remaining strips wind, the possibility of unwound springs moving outside the barriers to establish an undesirable connection of the movable coils is minimized.

The rotor assembly of Fig. 3 includes the pointer 41 and the damping disk 73 which are attached to a hub 161 mounted on the shaft. This hub also supports balance arms 163 having adjustable balance weights thereon and a lug 165 to which the inner end of the control spring 27 is attached.

The relationship between the rotor assembly and the magnetic structures 5 and 7 is illustrated in Fig. 4. The magnetic structure 7 includes a magnetic portion A having an annular magnetic core A1. This annular magnetic core is proportioned to pass through the coil 93 and has a channel A3 extending radially from the interior to the exterior of the annular core for the purpose of permitting passage of a side of the coil 93 therethrough. It may be noted that the annular magnetic core A1 and the coil 93 are "linked" together in a manner analogous to the linking of two links of a chain. The annular core A1 has a magnetic member A5 projecting therefrom adjacent the channel A3 to connect the annular core A1 to an outer magnetic element A7. The annular core A1 and the magnetic element A7 have adjacent surfaces which are spaced to define an annular air gap A9 within which a side of the coil 93 is positioned for rotation. This annular air gap may be of sufficient length to permit angular rotation of the coil 93 about the axis of the shaft 83 for an angular distance of the order of 250°. It will be observed that the annular core A1 and the magnetic member A5 are substantially in the form of a hook wherein the annular core A1 is the hook section and the magnetic member A5 is the shank section. A fixed coil AB surrounds the magnetic member A5 and when energized produces a magnetic field in the annular air gap A9.

Because of the channel A3, the annular core A1 for the coil 93 is asymmetric with respect to the path of travel of the coil. Such asymmetry is undesirable because of the solenoid action resulting from current flowing through the coil 93. This may be understood by assuming that the coil AB is deenergized and that a current flows in the coil 93. Under these conditions, no torque should be applied to the shaft 83 by the coil 93. However, because of the asymmetry of the annular magnetic core, the coil 93 tends to move to a position wherein the reluctance of the magnetic path associated therewith is a minimum.

In order to eliminate substantially this solenoid action, the magnetic structure 7 includes a second magnetic portion B which is similar to the magnetic portion A, but which is reversed with respect to the magnetic portion A about an axis perpendicular to the shaft 83 and parallel to the magnetic member A5. Since the magnetic portions A and B are similar in construction, parts of the magnetic portion B will be designated by the reference character B followed by the numeral applied to the corresponding part of the magnetic portion A.

By inspection of Fig. 4, it will be observed that the asymmetries of the magnetic portions A and B with respect to the path of travel of the coil 93 are such as to produce a resultant magnetic structure which is substantially symmetric with respect to the path of travel of the coil. This is accomplished by positioning the channels A3 and B3 adjacent opposite ends of the path of travel of the coil 93. As a result of this construction, substantially no torque resulting from solenoid action is applied by the coil 93 to the shaft 83.

Summarizing the discussion of solenoid action, when current passes through the coil 93 alone, the solenoid reaction between the magnetic portion A and the coil 93 causes the coil to seek a position wherein the reluctance offered to magnetic flux produced by the current flowing in the coil is a minimum. At the same time a solenoid reaction takes place between the magnetic portion B and the coil 93. However, since the magnetic portions A and B are reversed with respect to each other, the torques or forces resulting from the two aforesaid solenoid reactions act on the coil 93 to a substantial extent in opposite directions and substantially compensate for each other.

In order to permit the insertion of a preformed coil into embracing relationship with the annular magnetic cores A1 and B1, the magnetic portions A and B are spaced axially along the shaft 83 in any suitable manner for a distance sufficient to permit passage of a side of the coil 93 therebetween. Preferably the spacer is a magnetic structure S which is similar to the magnetic portion A except for the omission of the annular magnetic core A1. Although the magnetic portions A and B and the spacer S may be formed of magnetically soft iron or steel of solid section, preferably they are laminated, as illustrated in Fig. 4. Suitable shapes for the laminations are shown more clearly in Figs. 5 and 6. It will be observed that the lamination employed for the magnetic portion A is provided with four holes A13 for receiving mounting bolts and additional holes A15 and A17 for receiving rivets to be employed in securing the laminations to each other. In a similar manner, the lamination for the spacer is provided with holes S13 and S15. The required configurations and holes of the laminations may be formed readily by accurate punching operations.

Referring again to Fig. 4, the laminations in the magnetic portion A are secured to each other by means of rivets A19 which pass through the holes A17 in the various laminations (shown in Fig. 5). In a similar manner, the laminations in the magnetic portion B are attached to each other by rivets B19. The magnetic portions A and B, together with the spacer S, then are firmly attached to each other by rivets S17 which pass through the holes A15, S15 and B15 in the various laminations.

In instruments of the type illustrated in Fig. 4, the spacing between the coil 93 and the magnetic structure 7 is extremely small. For this reason if the instrument is employed in an installation subject to excessive shock, precaution should be taken to prevent deflection of parts of the magnetic structure into engagement with the coil 93. It will be observed that the annular core A1 and the magnetic member A5 form essentially a cantilever structure. Even though rivets are employed for securing the laminations together, slight movements of the laminations with respect to each other may result from the application of excessive shock to the instrument. This movement may suffice to bring one of the annular cores into engagement with the coil 93 and may result in damage to the coil. For this reason, it may be desirable to impregnate the laminations employed in an instrument to be subjected to excessive shock with a suitable cement or varnish, such as phenolic resin varnish and, after riveting the laminations together, to bake the magnetic structure 7. The baking operation converts the magnetic structure and varnish into the equivalent of a solid structure and substantially reduces the deflection of portions thereof in response to excessive shock.

The magnetic structure 5 is similar in construction to the magnetic structure 7. For reference purposes, however, the magnetic portions of the magnetic structure 5 are designated by the reference characters C and D and the fixed coil for the magnetic structure 5 is designated by the reference character CD. The fixed coils AB and CD generally are of similar construction. Parts of the magnetic portions C and D corresponding to similar parts of the magnetic portion A are designated by the reference characters C or D followed by the numerals employed in designating the corresponding parts of the magnetic portion A.

By inspection of Fig. 4, it will be observed that the magnetic structures 5 and 7 are displaced from each other angularly about the shaft 83 by 180°. The reason for this displacement may be understood by assuming initially that the magnetic structures are similarly oriented with respect to the shaft. Under this assumed condition, the coils 91 and 93 would be disposed on the same side of the shaft 83. Since these coils represent substantial portions of the total weight of the rotor assembly, a substantial counterweight would be required to balance the combined weight of the two coils. This would result in an undesirably heavy rotor assembly and would be accompanied by increased friction and bearing wear.

In addition, under the assumed condition, the fixed coils AB and CD would be disposed on the same side of the shaft 83. This would bring the fixed coils into proximity to each other and magnetic interference between the two coils might result. To prevent such interference, a magnetic shield might be required between the two fixed coils under the assumed condition.

By displacing the magnetic structures 5 and 7 about the shaft 83, as illustrated in Fig. 4, the coils 91 and 93 are disposed on opposite sides of the shaft 83 and inherently balance each other. In addition, the fixed coils AB and CD are disposed on opposite sides of the shaft 83. With this positioning of the fixed coils, it has been found that in most applications no shielding is required therebetween.

It is believed that the procedure for inserting the rotor assembly in the magnetic structures 5 and 7 now may be set forth. In assembling the instrument, the magnetic structures 5 and 7 are completed and attached to the base member 9 as shown in Fig. 1. The rotor assembly 3 then is completed as illustrated in Fig. 3. Turning now to Fig. 4, to facilitate reference thereto the lower sides of the coils 91 and 93 will be designated, respectively, leading sides 91A and 93A, whereas the upper sides of these coils will be designated trailing sides 91B and 93B.

The complete rotor assembly is positioned on the axis of the annular magnetic cores and the leading side 93A of the coil 93 is positioned adjacent the channel C3 of the magnetic structure 5. The rotor assembly then is dropped to pass the leading side 93A through the channel C3 until it is stopped by the anular core D1. The rotor assembly 3 next is rotated in a clockwise direction (looking at the rotor assembly from the pointer end thereof) until the leading side 93A is positioned adjacent the channel in the annular magnetic core D1. The rotor assembly 3 thereupon is dropped to pass the leading side 93A through the channel in the annular magnetic core D1 until the trailing side 93B of the coil 93 engages the annular maginetic core C1. The coil 93 now is in position to embrace the annular cores C1 and D1.

In order to pass the coil 93 completely through the magnetic structure 5, the rotor assembly 3 is rotated in a counterclockwise direction to position the trailing side 93B of the coil 93 adjacent the channel C3. Consequently, the rotor assembly may be dropped until the trailing side 93B engages the annular magnetic core D1. Rotation of the rotor assembly in a clockwise direction carries the trailing side 93B through the space between the annular magnetic cores C1 and D1 until the trailing side 93B is adjacent the channel in the annular magnetic core B1. The rotor assembly now may be dropped until the coil 93B is completely between the annular magnetic structures 5 and 7. It will be understood that the spacing of the magnetic structures 5 and 7 axially along the axis of the shaft 83 is sufficient to permit rotation of the coil 93 therebetween.

At this stage, the coil 93 is located between the magnetic structures 5 and 7, whereas the coil 91 is located above the magnetic structure 5. The rotor assembly 3 is rotated next to bring the leading side 93A of the coil 93 adjacent the channel A3. Such rotation simultaneously brings the leading side 91A of the coil 91 adjacent the channel C3. Therefore, the rotor assembly may be dropped to carry the leading sides 91A and 93A, respectively, through the channels C3 and A3 until these leading sides engage respectively the annular magnetic cores D1 and B1. Following this step, the rotor assembly 3 is rotated in a clockwise direction to bring the leading sides 91A and 93A, respectively adjacent the channels in the annular magnetic cores D1 and B1. Finally, the rotor assembly 3 is dropped to pass the leading sides 91A and 93A through the channels of the annular magnetic cores D1 and B1 until the trailing sides 91B and 93B are stopped, respectively, by the annular magnetic cores C1 and A1. The coil 91 now is in position to embrace both of the annular magnetic cores C1 and D1, whereas the coil 93 is in position to embrace both of the annular magnetic cores A1 and B1. Therefore, the bridge plate 19 (Fig. 1) may be attached to the bearing support 11 and the bearing screws 17 and 21 may be adjusted to position the shaft 83 for rotation with respect to its stator assembly.

As previously explained, the conductor strips 99, 101, 105 and 107 have their ends accurately positioned adjacent their associated lugs 121. Therefore, after installation of the rotor assembly, the ends of the conductor strips may be soldered to their lugs 121.

By reversing the above procedure, the rotor assembly 3 may be removed from the magnetic structures 5 and 7 for servicing or replacement. It should be noted that the convenient assembly and disassembly of the rotor assembly with respect to the stator assembly is achieved without introducing errors resulting from the solenoid action previously discussed and without necessitating separation of the magnetic structures into a plurality of parts. The one-piece construction of the laminations is particularly desirable for instruments of the type herein discussed for the reason that extremely accurate angular air gaps in the magnetic structures 5 and 7 are required. This requirement may be understood by assuming that with the parts in the position illustrated in Fig. 4, the pointer 41 indicates a value of 10 watts. Let it be assumed further that the annular air gap in the magnetic structure 5 is not uniform and that the coil 91 is positioned in the portion of the air gap having minimum length. Let it be assumed further that the annular air gap in the magnetic structure 7 is not uniform, and that the coil 93 is positioned in the portion of the air gap having maximum length.

If the conditions of energization of the instrument are such that the coils AB and 93 are deenergized and the coils 91 and CD are energized with an energization corresponding to 10 watts in the associated electrical circuit, the coil 91 being positioned in a portion of its annular air gap having low magnetic reluctance produces an excessive torque and rotates the pointer 41 to indicate a value in excess of 10 watts. Let it be assumed that the energization of the units is reversed and that the coils 91 and CD are deenergized. If the coils AB and 93 are energized by currents corresponding to a value of power of 10 watts in the associated electrical circuit, the coil 93 being in a portion of its air gap of maximum reluctance produces a low torque and advances the pointer 41 to indicate a value of power less than 10 watts. If the energization intended to indicate 10 watts of power is divided between the two units in different ratios, different values of power are indicated by the pointer 41. For this reason, observation of the pointer 41 fails to indicate accurately the power of an associated electrical circuit. Since the errors vary in accordance with the distribution of the energization of the two units, it is impossible to eliminate the errors by calibration of the instrument scale. For these and other reasons, it is desirable to construct the magnetic structures 5 and 7 of unitary laminations having accurate air gaps therein.

Referring again to Fig. 1, it will be observed that an annular bumper plate 171 is attached to the stator assembly to assist in locating the stator assembly with respect to the shell 49. As shown in Figs. 19 and 20, this bumper plate also may support an insulating block 173 on which the lugs 121 are mounted. The lugs, in turn, are connected through the conductors 59 to appropriate terminal screws 57 on the base member 9 (Fig. 1).

Each of the magnetic structures 5 and 7 has several aligned openings extending through all laminations therein. See, for example, the openings A13 and S13 of Figs. 5 and 6. A structure may be associated with each set of these aligned openings for securing the magnetic structures to the base plate 9. A suitable structure for attaching the stator assembly to the base member 9 is illustrated in Fig. 22. The magnetic structures 5 and 7 are provided with insulating sleeves 179 which pass through the openings in the magnetic structures. For example, in the magnetic structure 7, as shown in Fig. 22, the insulating sleeve 179 passes through the continuous opening formed by the holes A13, S13 and B13 punched in the various laminations. At each end of each insulating sleeve 179, an insulating washer 181 is located with its axis aligned with the axis of the insulating sleeve.

To position the magnetic structure 7 with respect to the base 9, a spacer 183 is associated with each of the insulating sleeves 179 in the magnetic structure 7. One of these spacers 183 is shown in Fig. 22. The spacer 183 may be in the form of a hexagonal metallic member having one end positioned against the base member 9 and its opposite end positioned in engagement with one of the insulating washers 181. Each of the spacers 183 has two studs 185 and 187 projecting from its ends. The stud 187 passes through the base member 9 and is securely attached thereto in a suitable manner as by means of a nut 189. The shell 49 may have ears 51a projecting from the flange 51 through which the studs 187 project. Each ear is secured by a nut 190, a lock washer 191 and a reenforcing plate 192 to one of the studs. It should be noted that the shell 49 and the magnetic structures are all attached to the studs 187. This substantially relieves the base member 9 from stress. The shell 49 is sufficiently rigid to provide support for the magnetic structures. In a similar manner four studs 185 (Fig. 21) are provided for the magnetic structure 7.

Each stud 185 passes through its associated insulating sleeve 179 and insulating washers 181 and through a boss 193 formed on the plate 13. The end of each stud 185 is in threaded engagement with a spacer 195 which serves to secure the plate 13 and the magnetic structure 7 to the base member 9. In a somewhat similar manner, the spacer 195 has a stud 197 projecting therefrom through the associated insulating sleeve 179 and insulating washers of the magnetic structure 5. A nut 199 at the end of the stud 197 secures the magnetic structure 5 to the spacer 195 and therethrough to the base member 9. It should be observed that with the specific mounting illustrated in Fig. 22, all of the insulating members are in compression. Each of the studs 197 also projects through the bumper plate 171. A nut 201 and lock washer 203 are associated with each of the studs 197 for the purpose of securing the bumper plate 171 thereto.

As previously explained, the measuring instrument illustrated in Fig. 1 has two separate single-phase units. The movable coils 91 and 93 of the two units are attached to a common shaft. This instrument is suitable for measuring functions of electrical quantities present in a three-wire or a polyphase electrical circuit. If a single-phase measuring instrument is desired, only one of the units, such as that including the magnetic structure 5 and the coil 91, may be employed. Such a measuring instrument is illustrated in Fig. 23, wherein parts similar to those of Fig. 1 are represented by the same reference characters. It will be observed that the coil 91 and the damping disk 73 are mounted on a shaft 205 which is somewhat shorter than the shaft 83 of Fig. 1. The shaft 205 is rotatably supported in the bearing screws 17 and 21. A support 207 corresponds to the support 11 of Fig. 1. The casing, dial and pointer assemblies of the instrument illustrated in Fig. 23 may be similar to the corresponding elements of Fig. 1. For this reason, a description of the casing and other similar parts of Fig. 23 is believed unnecessary.

Since the instrument of Fig. 23 has only one movable coil 91, a counterweight 209 is illustrated therefor. Also the pointer 61 is positioned on the side of the shaft opposite the coil to balance part of the weight of the coil. It will be noted that only the two conductor strips 99 and 101 and two lugs 121 are required for the rotor assembly of Fig. 23.

In assembling the instrument illustrated in Fig. 23, the coil 91 is threaded into embracing relationship with the annular cores of the magnetic structure 5 in the same manner discussed with reference to Fig. 4. After the coil 91 is positioned to embrace the annular cores, the shaft 205 is centered by means of the bearing screws 17 and 21. Since the instrument of Fig. 23 comprises, in effect, one of the units of the instrument of Fig. 1, the description of the latter instrument applies in substantial part to the instrument of Fig. 23.

In connecting the measuring instruments of Figs. 1 and 23 to an electrical circuit, some compensation may be required to correct the phase displacements between magnetic fluxes in the magnetic structures produced because of the hysteresis losses in the magnetic structures 5 and 7. Suitable connections for one of the units are illustrated in Fig. 24. In Fig. 24, the fixed and movable coils of one of the units are associated with an electrical circuit having the conductors L1 and L2. One of the coils is connected for energization in accordance with the voltage of the circuit, whereas the other coil is connected for energization in accordance with current flowing in the circuit. In most cases, the movable coil 91 is connected for energization in accordance with voltage whereas the fixed coil CD is connected for energization in accordance with current. It will be observed that the movable coil is connected across the conductors L1 and L2 through a multiplier resistor having two sections 241 and 243. A capacitor 245 is connected across the coil 91 and one section 241 of the resistor for the purpose of compensating the unit for the aforesaid phase displacement errors. Such compensation is well understood in the art. When a polyphase measuring instrument similar to that shown in Fig. 1 is employed, it will be understood that compensation may be required for each of the units in the polyphase instrument.

Certain subject matter herein disclosed is disclosed and claimed in our copending application, Serial No. 757,260, filed June 26, 1947.

Although the invention has been discussed with reference to certain specific embodiments thereof, numerous modifications are possible. The appended claims are drafted to cover all modifications falling within the spirit and scope of the invention.

We claim as our invention:

1. In an electromagnetic device, a coil, a magnetic structure having an air gap, winding means associated with the magnetic structure for producing a magnetic field in the air gap, means mounting said coil with a side in the air gap for movement relative to said magnetic structure over a predetermined travel, said magnetic structure comprising a first magnetic portion defining a path for magnetic flux produced by electrical current flowing through said coil throughout said travel, said magnetic portion providing a first substantial magnetic solenoid force in response to said current acting between said magnetic portion and said coil, a second magnetic portion defining a path for magnetic flux produced by electrical current flowing through said coil, said second magnetic portion providing a second substantial magnetic solenoid force in response to current in said coil acting between said second magnetic portion and said coil throughout said travel, and means mounting said magnetic portions to direct said forces in opposition to each other, whereby movement of said coil is substantially unaffected by said forces.

2. In an electromagnetic device, a pair of annular magnetic cores, means supporting said magnetic cores axially spaced and in substantial alignment on a common axis, each of said magnetic cores having a channel therein extending radially relative to said axis from the interior to the exterior of each of said magnetic cores, the channels in said magnetic cores being spaced angularly about said axis, and a coil linked with both of said magnetic cores.

3. In an electromagnetic device, a pair of annular magnetic cores, means supporting said magnetic cores in substantial alignment on a common axis, a magnetic member extending from each of said magnetic cores in substantially the same radial direction relative to said axis, each of said magnetic cores having a channel therein extending radially relative to said axis from the interior to the exterior of each of said magnetic cores, the channels in said magnetic cores being spaced angularly about said axis, to position said channels adjacent, but on opposite sides of, said magnetic members, and coil means linked with said magnetic cores, said magnetic cores being spaced axially along said axis by a distance sufficient to permit movement of a side of said coil means therebetween.

4. In an electromagnetic device, a pair of annular magnetic cores, means supporting said magnetic cores in substantial alignment on a common axis, a magnetic member extending from each of said magnetic cores substantially in a common radial direction relative to said axis, each of said magnetic cores having a channel therein extending radially relative to said axis from the interior to the exterior of each of said magnetic cores, the channels in said magnetic cores being spaced angularly about said axis to position said channels adjacent but on opposite sides of said magnetic members, a magnetic element surrounding said magnetic cores but spaced therefrom to define an arcuate air gap therebetween, said magnetic cores, said magnetic members and said magnetic element defining a magnetic path for directing magnetic flux into said air gap, coil means associated with said magnetic path for producing, when energized, magnetic flux in said air gap, a coil linked with both of said magnetic cores, said magnetic cores being spaced axially of said axis by a distance sufficient to permit movement of a side of said coil therebetween, said coil being proportioned for removal from said magnetic core by successive passage of a side thereof through one of said channels, rotation of said side between said magnetic cores into alignment with the other of said channels and passage of said side through said last-named channel, and means mounting said coil for rotation relative to said magnetic cores in a path wherein a portion of said coil moves through said air gap.

5. In an electromagnetic device, a pair of units; each of said units comprising a magnetic body having an inner pole piece and an outer pole piece spaced to define an annular air gap, stationary coil means associated with said magnetic body for producing, when energized, a magnetic field in said air gap, and a coil having a side positioned in said air gap for movement therethrough about a predetermined axis; means mounting said units with the axes of said coils in alignment, said units being positioned to space the stationary coil means of said units angularly about the common axes of said coils, whereby interference between said coil means is minimized, and means mounting said coils for rotation as a single assembly relative to the associated magnetic bodies.

6. In an electromagnetic device, a pair of units; each of said units comprising a pair of annular magnetic cores, means supporting said magnetic cores in substantial alignment on a common axis, each of said magnetic cores having a channel therein extending radially relative to said axis from the interior to the exterior of each of said magnetic cores, the channels in said magnetic cores being spaced angularly about said axis, and a coil linked with both of said magnetic cores; means mounting said units with the axes thereof substantially in alignment, said magnetic cores being spaced axially along said axis to permit movement of a side of said coil through said channels and through the space between the magnetic cores, and means connecting the coils of said units for rotation about their common axis as a single assembly relative to said magnetic cores, said units being angularly displaced approximately 180° from each other about their common axis, and said units being spaced axially of said common axis by a distance sufficient to permit substantial rotation of one of said coils about said common axis when said last-named coil is positioned between said units.

7. In an electromagnetic device, a pair of units; each of said units comprising a pair of annular magnetic cores, means supporting said magnetic cores in substantial alignment on a common axis, a magnetic member extending from each of said magnetic cores in substantially the same radial direction relative to said axis, each of said magnetic cores having a channel therein extending radially relative to said axis from the interior to the exterior of each of said magnetic cores, the channels in said magnetic cores being spaced angularly about said axis, to position said channels adjacent, but on opposite sides of, said magnetic member, and coil means linked with said magnetic cores; means mounting said units with the axes thereof substantially in alignment, said units being angularly spaced about their common axis to position the magnetic members of the units on opposite sides of said common axis, and means mounting the coil means of both units for rotation as a single assembly about said common axis.

8. In an electromagnetic device, a pair of units; each of said units comprising a pair of annular magnetic cores, means supporting said magnetic cores in substantial alignment on a common axis, a magnetic member extending from each of said magnetic cores in substantially the same radial direction relative to said axis, each of said magnetic cores having a channel therein extending radially relative to said axis from the interior to the exterior of each of said magnetic cores, the channels in said magnetic cores being spaced angularly about said axis, to position said channels adjacent, but on opposite sides of, said magnetic member, first coil means linked with said magnetic cores, and second coil means surrounding said magnetic members for directing magnetic flux into said magnetic cores when said second coil means is energized; means mounting said units with the axes thereof substantially in alignment, said units being angularly spaced about their common axis to position the magnetic members of the units on opposite sides of said common axis, and means mounting the first coil means of both units for rotation as a single assembly about said common axis.

9. In an electromagnetic device, a pair of units; each of said units comprising a pair of annular magnetic cores, means supporting said magnetic cores in substantial alignment on a common axis, a magnetic member extending from each of said magnetic cores substantially in a common radial direction relative to said axis, each of said magnetic cores having a channel therein extending radially relative to said axis from the interior to the exterior of each of said magnetic cores, the channels in said magnetic cores being spaced angularly about said axis to position said channels adjacent but on opposite sides of said magnetic members, a magnetic element surrounding said magnetic cores but spaced therefrom to define an arcuate air gap therebetween, said magnetic cores, said magnetic members and said magnetic element defining a magnetic path for directing magnetic flux into said air gap, coil means associated with said magnetic path for producing, when energized, magnetic flux in said air gap, a coil linked with both of said magnetic cores, said magnetic cores being spaced axially of said axis by a distance sufficient to permit movement of a side of said coil therebetween, said coil being proportioned for removal from said magnetic core by successive passage of a side thereof through one of said channels, rotation of said side between said magnetic cores into alignment with the other of said channels and passage of said side through said last-named channel, said coil being disposed for rotation about said common axis in a path wherein a portion of said coil moves through said air gap; means mounting said units with their axes substantially in alignment, and means mounting the coils of said units for movement as a single assembly about their common axis relative to said magnetic cores, said units being displaced angularly about their common axis by substantially 180°, and said units being spaced axially along their common axis by a distance sufficient to permit substantial rotation of one of said coils when positioned between said units to permit alignment of said coils with the channels of their respective units during assembly of the device.

10. In an electromagnetic device, a magnetic structure defining a magnetic path including an air gap, said magnetic structure including a laminated cantilever magnetic core, a coil surrounding said magnetic core and slightly spaced therefrom to permit relative movement therebetween, said coil having a side positioned in said air gap, means mounting said coil for movement relative to said magnetic core in a path wherein said side moves through said air gap, adhesive bonding means firmly uniting the laminations of said magnetic core for restricting deflection of the free end of said cantilever magnetic core with respect to the fixed end of said core, and means associated with said magnetic structure for producing magnetic flux in said air gap.

11. In an electromagnetic device, a pair of similar magnetic structures, each of said magnetic structures comprising a hook-shaped magnetic core having a hook section and having a shank section projecting from said hook section, each of said magnetic structures also comprising a magnetic member surrounding, but spaced from, a substantial portion of the associated hook section to form therewith an arcuate air gap, said hook section, shank section and magnetic member of each of said magnetic structures defining a magnetic path for directing magnetic flux through the associated air gap, and means mounting said magnetic cores with their hook sections extending around a common axis and with their shank sections all extending away from said axis in substantially the same radial direction, one of said magnetic cores being reversed relative to the other of the magnetic cores about an axis parallel to said radial direction, a spacer intermediate said magnetic structures for spacing said magnetic structures axially along said first-named axis, said spacer comprising a magnetic body having faces engaging said magnetic members and terminating short of the hook sections of said magnetic cores, whereby said hook sections have an air space therebetween.

12. In an electromagnetic measuring instrument, a pair of measuring units; each of said units comprising a magnetic structure having an air gap, and a coil having a portion positioned for rotation through said air gap, a portion of said magnetic structure extending through said coil in a predetermined operative position of said coil relative to said magnetic structure, said coil being movable at least partly in an axial direction from said operative position to a position external to said magnetic structure; shaft means mounting the coils for rotation as a single entity relative to the respective magnetic structures, and terminal means for both of said coils positioned on the shaft means adjacent a first end of said shaft means external to said magnetic structures.

13. In an electromagnetic device, a pair of units, each of said units including a plurality of magnetic structures, each of said magnetic structures comprising a hook-shaped magnetic core having a hook section and having a shank section projecting from said hook section, and means mounting said magnetic cores with their hook sections extending around a common axis and with their shank sections all extending away from said axis in substantially the same radial direction, certain of said magnetic cores being reversed relative to the remainder of the magnetic cores about an axis parallel to said radial direction, and means mounting said units in spaced relationship with their common axes in alignment.

14. In an electromagnetic device, a pair of units, each of said units including a plurality of magnetic structures, each of said magnetic structures comprising a hook-shaped magnetic core having a hook section and having a shank section projecting from said hook section, and means mounting said magnetic cores with their hook sections extending around a common axis and with their shank sections all extending away from said axis in substantially the same radial direction, certain of said magnetic cores being reversed relative to the remainder of the magnetic cores about an axis parallel to said radial direction, and means mounting said units in spaced relationship with their common axes in alignment, said units being spaced angularly about the line of their common axes by substantially 180°, and one of said units being inverted with respect to the other of said units.

15. In an electromagnetic device, a pair of units; each of said units comprising a pair of annular magnetic cores, means supporting said magnetic cores in substantial alignment on a common axis, each of said magnetic cores having a channel therein extending radially relative to said axis from the interior to the exterior of each of said magnetic cores, the channels in said magnetic cores being spaced angularly about said axis, and a coil linked with both of said magnetic cores, said magnetic cores having a space therebetween sufficient to permit movement of a side of said coil between said magnetic cores, said coil being proportioned for movement through the passage formed by said channels and said space from a position external to said magnetic cores to a position wherein said coil links said magnetic cores; means mounting said units with the axes thereof substantially in alignment, and means connecting the coils of said units for movement as a single assembly relative to said magnetic cores, said units having a space therebetween which with said passages forms a resultant passage through which one of said coils may be moved from a position linking a first pair of said magnetic cores to a position linking a second pair of said magnetic cores.

16. In an electromagnetic device, a pair of similar magnetic structures, each of said magnetic structures comprising a hook-shaped magnetic core having a hook section and having a shank section projecting from said hook section, each of said magnetic structures also comprising a magnetic member connected to the shank section and surrounding, but spaced from, a substantial portion of the associated hook section to form therewith an arcuate air gap, a coil having a coil side disposed in the air gaps for movement therethrough, said hook section, shank section and magnetic member of each of said magnetic structures defining a magnetic path for directing magnetic flux through the associated air gap, and means mounting said magnetic cores with their hook sections extending around a common axis, one of said magnetic cores being reversed relative to the other of the magnetic cores about an axis parallel to said radial direction, said magnetic cores being spaced axially along said first-named axis to complete a passage extending through the magnetic cores to permit insertion and removal of the coil therethrough relative to the magnetic structures.

DOUGLASS A. YOUNG.
LAWRENCE J. LUNAS.
BERNARD E. LENEHAN.

REFERENCES CITED

The following references are of record in the file of this patent:

UNITED STATES PATENTS

| Number | Name | Date |
| --- | --- | --- |
| 1,847,936 | Faus | Mar. 1, 1932 |
| 1,901,197 | Simpson | Mar. 14, 1933 |
| 1,918,023 | Faus | July 11, 1933 |
| 1,952,917 | Granfield | Mar. 27, 1934 |
| 2,218,376 | Corson | Oct. 15, 1940 |
| 2,221,643 | Lederer | Nov. 12, 1940 |
| 2,315,654 | Putman | Apr. 6, 1943 |